US011341224B2

(12) United States Patent
Bolme et al.

(10) Patent No.: US 11,341,224 B2
(45) Date of Patent: May 24, 2022

(54) HANDHELD MULTI-SENSOR BIOMETRIC IMAGING DEVICE AND PROCESSING PIPELINE

(71) Applicant: UT Battelle, LLC, Oak Ridge, TN (US)

(72) Inventors: David S. Bolme, Oak Ridge, TN (US); Hector J. Santos Villalobos, Oak Ridge, TN (US); Aravind K. Mikkilineni, Knoxville, TN (US)

(73) Assignee: UT Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/162,319

(22) Filed: Jan. 29, 2021

(65) Prior Publication Data

US 2021/0256103 A1   Aug. 19, 2021

(51) Int. Cl.
*G06K 9/20* (2006.01)
*G06F 21/32* (2013.01)
(Continued)

(52) U.S. Cl.
CPC .............. *G06F 21/32* (2013.01); *G06V 10/60* (2022.01); *G06V 40/50* (2022.01); *G06V 40/70* (2022.01); *H04N 5/33* (2013.01)

(58) Field of Classification Search
CPC . G06F 21/32; G06K 9/00597–9/00617; G06K 9/00006–9/0012; G06K 9/00892;
(Continued)

(56) References Cited

U.S. PATENT DOCUMENTS

| 7,620,309 B2 | 11/2009 | Georgiev |
| 7,949,252 B1 | 5/2011 | Georgiev |

(Continued)

FOREIGN PATENT DOCUMENTS

CN    108550184 A  *  9/2018

OTHER PUBLICATIONS

Raghavendra, "Exploring the Usefulness of Light Field Cameras for Biometrics: An Empirical Study on Face and Iris Recognition", IEEE Transactions On Information Forensics and Security, vol. 11, No. 5, May 2016, pp. 922-936. (Year: 2016).*

(Continued)

*Primary Examiner* — Brian Werner
(74) *Attorney, Agent, or Firm* — Warner Norcross + Judd LLP

(57) ABSTRACT

A handheld biometric imaging device having an array of cameras configured to simultaneously capture face, iris and fingerprint biometrics of a subject. The device includes a plurality of visible-light cameras and a plurality of infrared-light cameras capable of being triggered simultaneously to obtain a plurality of images from which a 3D image of the light field can be constructed. The device includes a plurality of visible-light illuminators and a plurality of infrared-light illuminators that allow images of a subject to be captured under different lighting profiles. The device may include an onboard control system that is capable of reconstructing a face region, an iris region and a fingerprint region from the 3D light-field image, and then extract a corresponding face template, an iris template, and a fingerprint template from the respective reconstructed regions. The extracted face, iris, and fingerprint templates may be used for enrollment and/or comparison against a biometric-template database associated with one or more watchlists.

24 Claims, 7 Drawing Sheets

(51) Int. Cl.
*H04N 5/33* (2006.01)
*G06V 10/60* (2022.01)
*G06V 40/50* (2022.01)
*G06V 40/70* (2022.01)

(58) Field of Classification Search
CPC ............... G06K 9/00221–2009/00328; G06T 2207/10052; G06T 7/557; H04N 5/22541
See application file for complete search history.

(56) References Cited

U.S. PATENT DOCUMENTS

| | | |
|---|---|---|
| 8,228,417 B1 | 7/2012 | Georgiev et al. |
| 8,315,476 B1 | 11/2012 | Georgiev et al. |
| 8,958,608 B2 | 2/2015 | Santos-Villalobos et al. |
| 9,811,729 B2 | 11/2017 | Santos-Villalobos et al. |
| 10,380,421 B2 | 8/2019 | Santos-Villalobos et al. |
| 2015/0347841 A1* | 12/2015 | Mears ............... G06K 9/00604 348/46 |

OTHER PUBLICATIONS

Raghavendra et al., "A New Perspective—Face Recognition with Light-Field Camera", IEEE publication, 2013, 8 pages total. (Year: 2013).*

Raghavendra et al., "Combining Iris and Periocular Recognition using Light Field Camera", 2013 Second IAPR Asian Conference on Pattern Recognition, IEEE Computer Society, 2013, pp. 155-159. (Year: 2013).*

Gaochang Wu et al., Light Field Image Processing: An Overview, IEEE Journal of Selected Topics in Signal Processing, vol. 11, No. 7, Oct. 2017, pp. 927-955.

Ryszard S. Choras, A Review of Image Processing Methods and Biometric Trends for Personal Authentication and Identification, International Journal of Circuits, Systems and Signal Processing, vol. 10, 2016, pp. 367-376.

Bennett Wilburn et al., High Performance Imagine Using Large Camaera Arrays, Association for Computing Machinery, Inc., Copyright 2005, pp. 765-776.

* cited by examiner

HANDHELD MULTI-SENSOR BIOMETRIC IMAGING DEVICE AND PROCESSING PIPELINE

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present invention relates to biometric imaging systems, and more particularly to biometric imaging systems for capturing images for biometrics enrollment, forensics, and intelligence collection.

BACKGROUND OF THE INVENTION

Biometric analysis has taken on an important role in providing safety and security. Biometrics are unique physical characteristics of an individual that can be used for automated recognition. For example, face, irises, and fingerprints have physical characteristics that are unique to an individual, and images or other representations of those biometric features can be used to assist in uniquely identifying an individual through the use of computerized systems. Traditional biometric systems are able to confirm the identity of an individual with a high degree of accuracy by comparing that individual's biometric information against a database of stored biometric information of known persons. The applications of biometric systems are many. Biometrics are employed in law enforcement, border security, customs enforcement, commercial security applications, civil identification, and healthcare just to name a few applications.

Conventional biometric systems typically capture and compare biometrics independently using separate biometric specific systems. For example, when interested in face recognition, a system incorporating a camera configured to capture and process facial images would be used. When it is desirable to use fingerprint biometrics, a system configured to capture and compare fingerprints is used. Similarly, when it is desirable to consider iris biometrics, a system incorporating a camera configured for use in capturing and comparing iris biometrics is used. To capture high quality images in conventional biometric imaging systems, the camera needs to be mechanically focused, which takes time and complicates the process. In many situations, poor images are captured and need to be retaken. Lastly, fingerprints are typically captured one or two at a time which dramatically increases the time required to capture fingerprint biometrics.

There remains a long felt and unmet need for a handheld biometric imaging device capable of facilitating the simultaneous capture of biometric information of multiple types, along with the processing and comparison of the captured biometric information.

SUMMARY OF THE INVENTION

The present invention provides a handheld biometric imaging device that incorporates a multi-sensor camera array capable of simultaneously capturing corresponding images of a subject, and a data processing apparatus to process the captured images for deriving biometric information relating to the face, iris and fingerprints of the subject. The multi-sensor camera array suitably includes a plurality of visible-light cameras and a plurality of infrared-light cameras that are configured and arranged to obtain simultaneous images of the subject. The different cameras may be spaced apart and/or have different focal lengths so that depth information can be obtained from the collection of images. For example, the visible-light cameras, or the infrared-light cameras, or both the visible-light cameras and the infrared-light cameras are spaced apart to allow simultaneous images of the subject to be taken from different perspectives, which allows light field information (e.g. depth information) to be computationally derived from the collection of visible-light images and infrared-light images. In addition to being spaced apart, the visible-light cameras, or the infrared-light cameras, or both the visible-light cameras and the infrared-light cameras have suitably different focal lengths. This allows images from different perspectives and with different focal lengths to be taken simultaneously so that light field information (e.g. depth information) can be computationally derived from the collection of visible-light images and infrared-light images.

In one embodiment, the device includes an onboard control system that derives a multi-spectral (e.g. visible light and infrared light) 3D image of the light field from a combination of the visible-light images and the infrared-light images using traditional computational methods.

In one embodiment, the device includes an array of illumination sources that can be activated in different patterns to illuminate the target with different illumination profiles. The array of illumination sources may include a plurality of visible light illumination sources, such as white LEDs, and a plurality of infrared illumination sources, such as infrared LEDs. The illumination sources may be spaced apart from one another so that activation of different illumination sources results in different illumination angles on the target, thereby facilitating recognition of contours and associated depth information.

In one embodiment, the device includes an onboard control system that generally includes an image capture subsystem configured to control the plurality of illumination sources and to capture a plurality of sequential images under a plurality of different illumination profiles; an image processing subsystem configured to process the captured images to generate an iris region reconstruction, a fingerprint region reconstruction and a face region reconstruction; a biometrics processing subsystem that extracts an iris template from the iris region reconstruction, a fingerprint template from the fingerprint region reconstruction and a face template from the face region reconstruction; an onboard watchlist subsystem that compares the extracted iris template, the extracted fingerprint template, and the extracted face template against an onboard biometric-template database, corresponding to, for example, a watchlist; and a user interface configured to, for example, initiate operation in response to user input and display an output indicative of the results of the comparison performed by the onboard watchlist subsystem.

In one embodiment, the image processing subsystem includes an initial stage implemented in vision-controller circuitry, which is configured as one or more of a specialized CPU, GPU, FPGA or ASIC, and a secondary stage implemented in a general-purpose controller. Implementing the initial stage in the vision-controller circuitry allows the device to perform high speed and lower power image capture and perform initial processing of the captured images at a higher speed and lower power than could be achieved with a general purpose controller. In one embodiment, the initial stage controls operation of the array of illumination sources, capture of images from the array of image sensors and initial processing of the captured images. For example, in one embodiment, the initial stage may implement algorithms that perform face and hand tracking, select regions of interest (e.g. face, iris and fingerprints) and assess quality of images.

In one embodiment, the secondary stage implements supplemental image processing and enhancement, as well as biometric processing and analysis. For example, in one embodiment, the secondary stage may implement algorithms that perform iris region reconstructions, fingerprint region reconstruction and face region reconstruction. With regard to biometric processing and analysis, the secondary stage may implement algorithms that extract the iris template, the fingerprint template and the face template. Further, the secondary stage may compare the extracted biometric templates against a biometric-template database associated with one or more watchlists to determine if the subject is on at least one of the watchlists.

In one embodiment, the onboard control system includes a communication subsystem that provides communication with external resources, such as network based biometric systems or databases. The communication subsystem may include a wireless communication capability, such as WiFi, cellular, satellite, Bluetooth or other RF-based communication systems, or LiFi or other light-based communication systems, and/or a wired communication capability, such as Ethernet or MODBUS. For example, in one embodiment, the communication system is configured to transfer the extracted iris template, the extracted fingerprint template and the extracted face template to an external resource. In some applications, the external resource can be used to store and maintain a database of extracted biometric templates and/or to assist in comparing the extracted biometric templates with a template database that may correspond to one or more watchlists.

In one embodiment, the image processing subsystem is configured to use the light field information together with image processing algorithms to convert an acquired fingerprint image into an equivalent image simulating contact with a conventional fingerprint reader, whereby the extracted fingerprint template can be directly compared with conventional fingerprint templates obtained using conventional fingerprint readers.

In one embodiment, the image processing section is configured to use the light field information and image processing to add depth information to the face template extraction, whereby the face template extraction can be directly compared with conventional face templates that include depth information.

The present invention provides a highly convenient handheld biometric imaging device that can rapidly acquire and process biometric images using a multi-sensor camera array that provides depth information. The device is capable of simultaneously capturing images of the face, fingerprints and irises of the subject so that separate capture procedures are not required for each biometric feature. This device uses 3D light-field imaging technology to greatly improve the ease and speed of biometric capture by allowing the camera array to image an individual's face, iris, and fingerprints simultaneously. 3D light-field imaging technology eliminates the need to mechanically adjust focus on the camera itself or to precisely align the desired biometric with respect to the sensor prior to image capture. Instead, computational and imaging processing techniques can be used post-image capture to compensate for these non-idealities. This post-capture processing can reduce the time needed for enrolling and identifying new subjects, for example, to just five or ten seconds per subject. In addition to biometrics, the camera system will capture 3D and multispectral data and will facilitate the use of advanced image processing and machine learning techniques to support additional forensics and intelligence collection applications. Another benefit of the present invention is that it provides a more sanitary system that is capable of capturing fingerprints in a non-contact manner. This is especially beneficial for fingerprint devices used to process large numbers of people in environments where the spread of viruses and other diseases might be enabled by touch sensors. For example, sensors that are touched may require sterilization of the device between people which slows the capture process, creates waste, and raises cost among other issues.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF CURRENT EMBODIMENTS

Overview.

Figure 1:
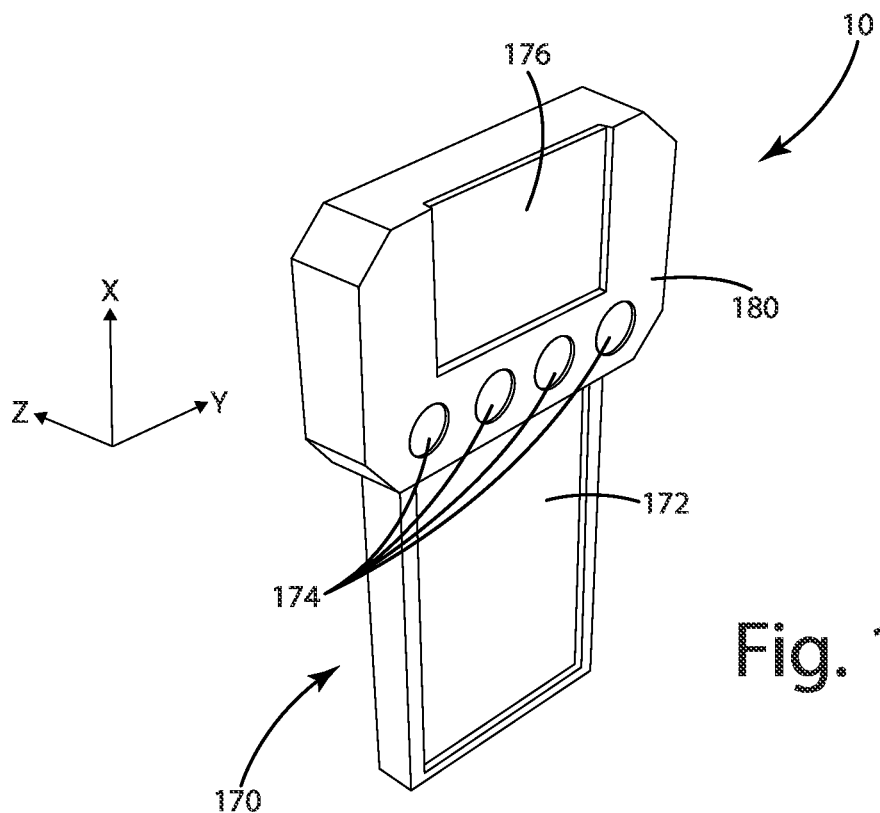
FIG. 1 is a front perspective view of a handheld biometric imaging device in accordance with one embodiment of the present invention.
Figure 2:
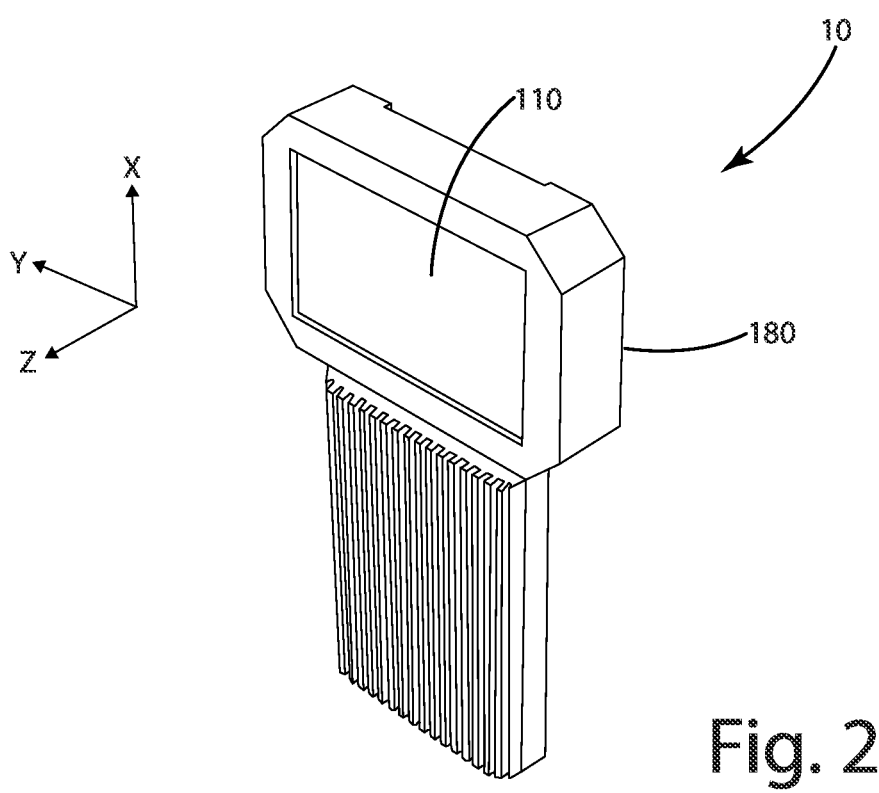
FIG. 2 is a rear perspective view of the handheld biometric imaging device of FIG. 1.
Figure 6:
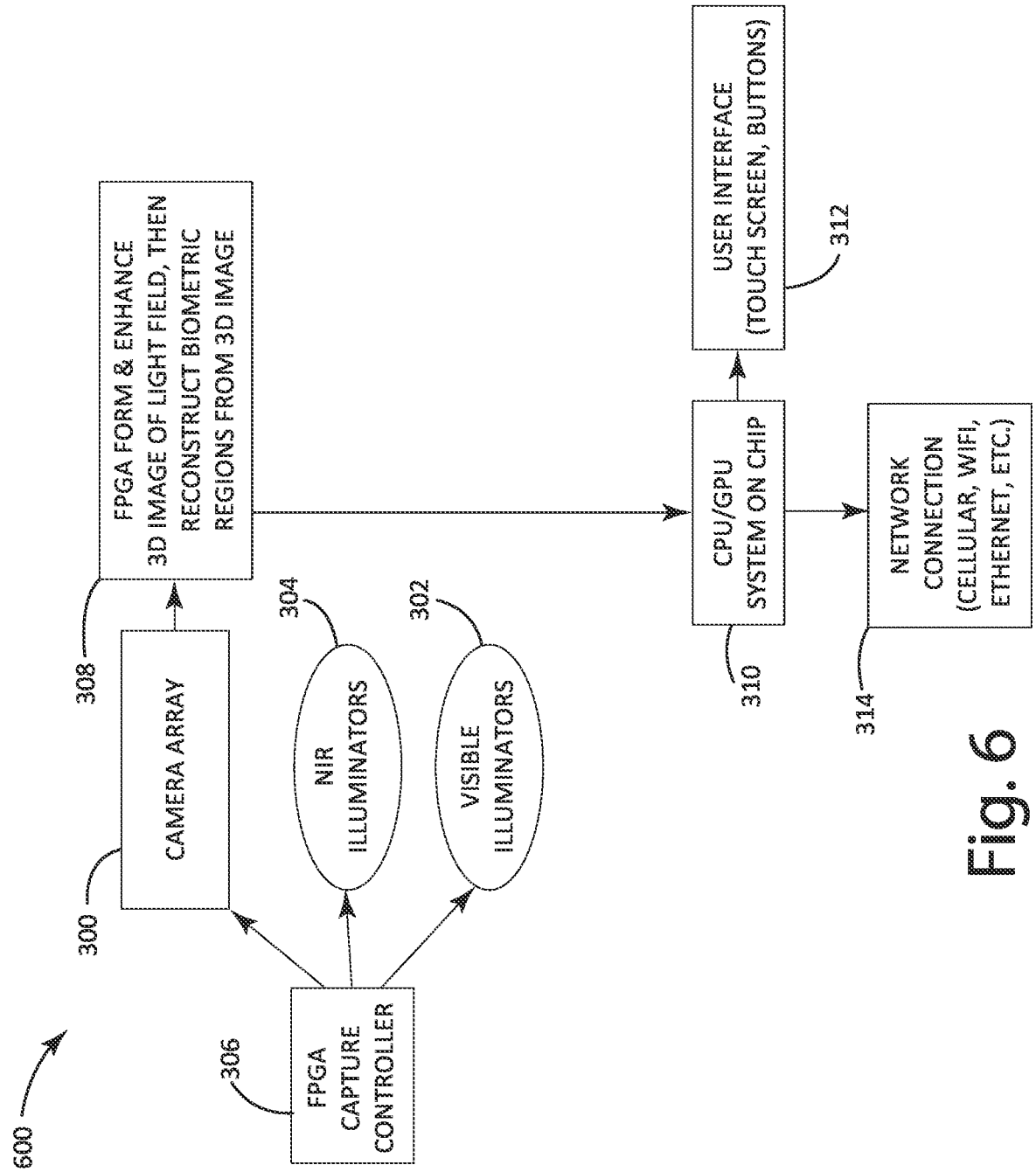
FIG. 6 is a block diagram illustrating the system components.
Figure 7:
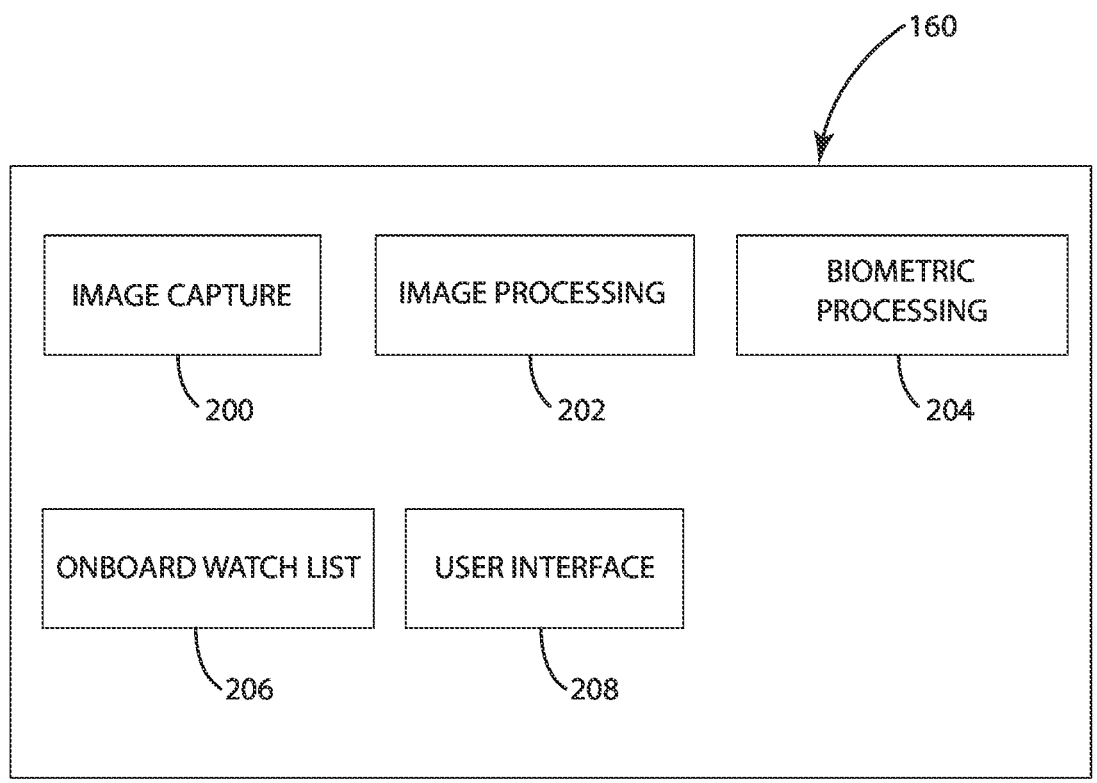
FIG. 7 is a block diagram of the control system.

A handheld biometric imaging device in accordance with one embodiment of the present invention is shown in FIGS. 1 and 2, and generally designated 10. The handheld biometric imaging device 10 is a lightweight, handheld unit that may be carried by an individual and used in a wide range of settings where rapid image capture, processing, biometric assessment, enrollment and/or other biometric-related functions are desired. In the illustrated embodiment, the handheld device 10 is configured for use with face, iris, and fingerprint biometrics. Referring to FIGS. 6 and 7, the handheld biometric imaging device 10 generally includes an array of cameras 300 configured to take simultaneous images of a subject, a plurality of illumination sources 302 and 304 to illuminate the subject during image capture, and an onboard control system 160 (implemented, for example, within FPGA capture controller 306, FPGA image processor 308 and CPU 310) that controls image capture and performs a variety of onboard computational and image processing procedures. In this embodiment, the onboard control system 160 is generally configured to control the cameras 300 and the illumination sources 302 and 304 to simultaneously capture images of the face, irises and fingerprints of the subject; to construct a 3D image of a light field from the captured images; to generate reconstructions of the iris regions, fingerprint regions, and face region; to process the reconstructions to extract iris templates, fingerprint templates, and/or a face template; and to compare the extracted iris templates, the extracted fingerprint templates, and the extracted face templates with an onboard template database that corresponds to a watchlist. The captured biometric information may be used to enroll the subject in one or more appropriate biometric databases and/or to identify the subject through comparison of the captured biometric information against corresponding biometric databases.

Handheld Biometric Imaging Device.

Figure 3:
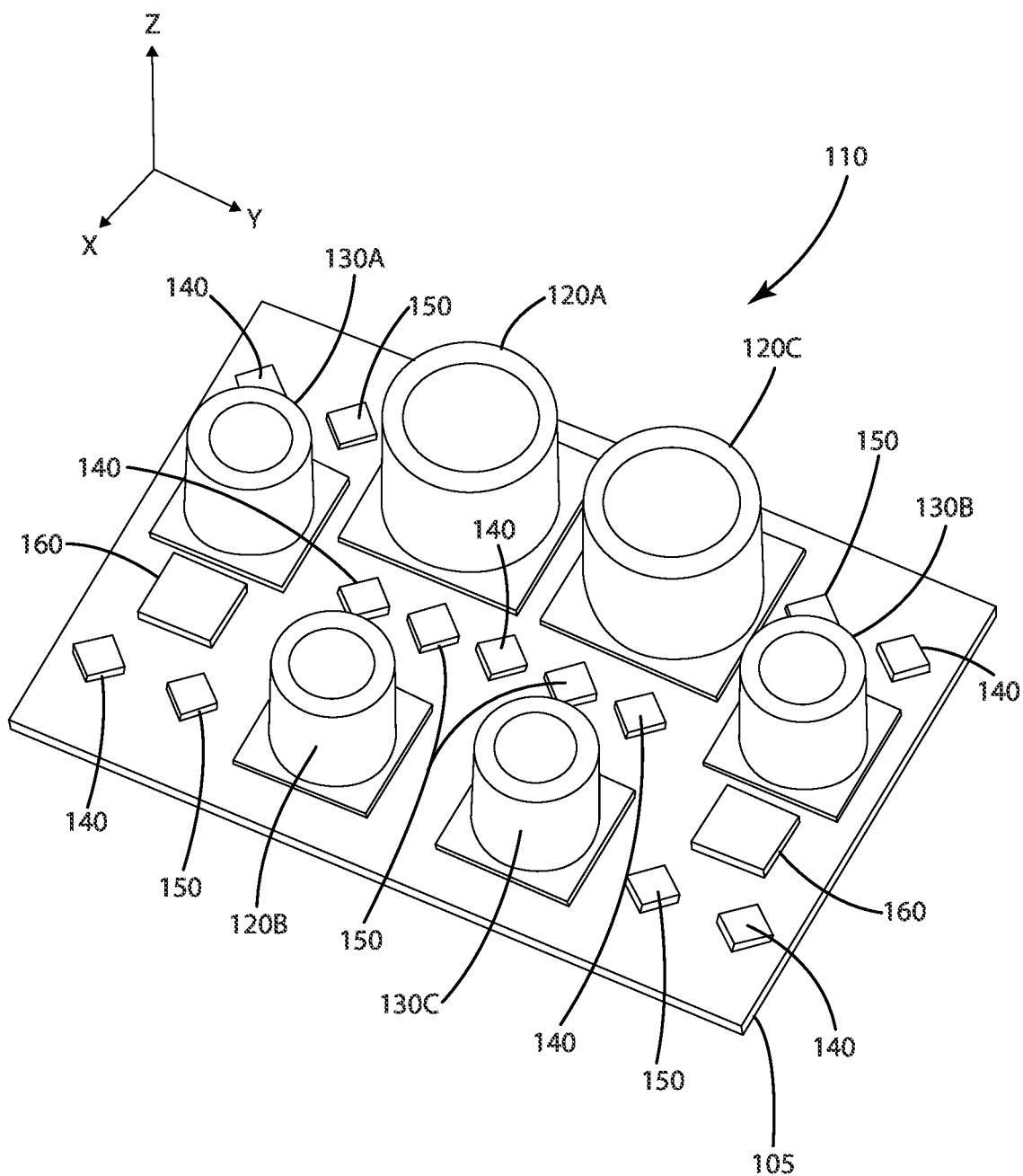
FIG. 3 is a perspective view of a control board for the handheld biometric imaging device.

The handheld biometric imaging device 10 will now be described in more detail with reference to FIGS. 1-7. As shown in FIGS. 1-3 and described in more detail below, the handheld biometric imaging device 10 of the illustrated embodiment is a portable, touch screen device that is in some ways similar to a smart phone. The device 10 generally includes a camera array consisting of a plurality of cameras, such 4-9 cameras, for instance; an array of illuminators, such as LEDs; one or more high speed chips for data input, control of the image capture process, and initial image processing and analysis; and a conventional processor (e.g. a CPU/GPU or system on a chip), such as an NVidia TX1 or TX2 compute module, to provide high speed image processing and analysis, and to provide machine learning capabilities in some applications. Such processors may also handle other functions, such as user interface and communications with external devices (wired or wireless).

In the illustrated embodiment, the device 10 uses common cameras and a variety of common LED illuminators. The device 10 may include the control board 110 shown in FIG. 3, which is described in more detail below. The control board 110 includes multiple cameras and light emitting diode (LED) illuminators. Depending on camera selection, the device 10 can be configured to capture stereo images, high resolution iris images, multi-spectral images and HDR images simultaneously. The device 10 includes field programmable gate array (FPGA) controllers (or other logic devices) to precisely control the timing of the illuminators and the image capture. For the cameras of the array to operate together, each control board may be electronically calibrated, which may include mapping each camera's distortion parameters and field of view (FOV), as well as measuring the relative intensities of the illuminators using conventional calibration algorithms. In the illustrated embodiment, each camera in the camera array is selected for a specific role, which may vary from application to application to create the desired light field capture system and to extend the system-level specifications and capabilities beyond those of any individual camera.

In the illustrated embodiment, the handheld biometric imaging device 10 generally includes an array of cameras including a plurality of visible-light cameras 130A, 130B and 130C and a plurality of infrared-light cameras 120A, 120B and 120C; an array of illumination sources including a plurality of visible-light illumination sources 150 and a plurality of infra-red illumination sources 140; a user interface 170; and an onboard control system 160. In the illustrated embodiment, the device 10 includes a control board 110 including a board 105 (e.g. circuit board or printed circuit board) that supports the various electronic components, such as array of cameras, the array of illumination sources, and the onboard control system. In the illustrated embodiment, the user interface includes a touchscreen 172 and a plurality of buttons 174. In this embodiment, the touchscreen 172 and buttons 174 are configured to receive user input, for example, to allow user control of the device 10. In some applications, it may be desirable to reduce the need for an operator to interact with the touchscreen 172. This may be of particular interest in applications where an operator is likely to wear gloves, such as in the context of use by military ground forces. In such applications, the user interface may be configured so that the buttons 174 control the most commonly used functions of the device 10, such as initiation of image capture, as well as real-time management and control of processing, biometric assessment and enrollment, thereby eliminating the need to use the touchscreen 172 during routine use. Further, the buttons 174 may be configured to facilitate use while wearing gloves. For example, the buttons may be sized (e.g. enlarged) and/or spaced apart from one another so that each button can be easily and reliably operated individually without the need to remove gloves. The touchscreen 172 is configured to provide visual output to the user, for example, to confirm that biometric information has been captured, to display the captured biometrics and/or to display the results of a biometric comparison of the subject against a watchlist.

As shown in FIGS. 1 and 2, the handheld biometric imaging device 10 may include a housing 180 that contains or otherwise supports the control board 110, the user interface 170 and the onboard control system 160. Although not shown, the device 10 also includes a power source, such as batteries or other electrical energy storage device. In addition or as an alternative, the handheld biometric imaging device 10 may include a power input for receiving power from an external power source. In some applications, the handheld biometric imaging device 10 may be ruggedized to military specifications to reduce the risk of damage from drops, impacts, water, dust, and other handling and environmental risk factors. For example, the housing 180, touchscreen 172, buttons 174, cameras 130A-C, 120A-C and/or other electronics and device components may be designed to meet or exceed all applicable military specifications.

In the illustrated embodiment, the handheld biometric imaging device 10 may also include a touch-based fingerprint sensor 176 that can, in some applications, capture higher quality fingerprints than the touchless sensor, or larger rolled prints when more complete biometric collections are required. For example, the device 10 may include a conventional optical or capacitive fingerprint sensor. The fingerprint sensor 176 may be used as an alternative or a supplement to the fingerprint imaging capabilities of the device 10.

The device 10 may also include attachment points which will allow for eventual modular hardware updates. For example, the device 10 may include attachment points that will support eventual addition of wireless or satellite communication capabilities, additional mission specific sensors, data capture devices, interchangeable battery packs, DNA or trace evidence collection kits, etc.

The onboard control system 160 will now be described in more detail with reference to FIG. 7. In the embodiment of FIG. 7, the onboard control system 160 generally includes an image capture subsystem 200, an image processing subsystem 202, a biometrics processing subsystem 204, an onboard watchlist section 206, and a user interface 208. Note that, herein, the term "subsystem" is used interchangeably as the term "functional section" or simply "section." Each of these sections may be implemented through a combination of conventional hardware and associated computer software (e.g. software, firmware and other computer instructions).

In this embodiment, the image capture section 200 is configured to control the visible-light illumination sources 150, the infrared-light illumination sources 140, the visible-light cameras 130A, 130B, 130C, and the infrared-light cameras 120A, 120B, 120C to simultaneously capture sets of infrared-light images and visible-light images under one or more illumination profiles. Note that the illumination profiles can be predetermined, or they can be generated randomly or pseudo-randomly. For example, the image capture section 200 may be configured to activate one or more of the visible-light illumination sources and one or more of the infrared-light illumination sources to provide a first illumination profile, and then to simultaneously capture a first set of images from the plurality of cameras while the subject is illuminated in accordance with the first illumination profile. If desired, the image capture section 200 may be configured to capture additional sets of simultaneous images under the same or different illumination profiles. For example, the image capture section 200 may be configured to activate one or more of the visible-light illumination sources and one or more of the infrared-light illumination sources to provide a second illumination profile different from the first profile, and then to simultaneously capture a second set of images from the plurality of cameras while the subject is illuminated in accordance with the second illumination profile. The process can be repeated for essentially any number of additional illumination profiles to capture the desired number of sets of images.

While a traditional camera uses a single optical path to project an image of a scene onto the camera's image sensor, the camera array of the present invention simultaneously captures images of the scene projected along multiple optical paths onto each corresponding camera's image sensor such that the light field produced by the scene can be reconstructed computationally. Rather than just capturing the intensity of the light as an imaging sensor of a traditional camera would, the camera array provides information regarding the direction of the incoming light. Once a scene is captured in this manner, conventional computation techniques may be used to exploit the additional information collected by the camera array. By analyzing the computationally reconstructed light field, the image processing section 202 of the onboard control system 160 can produce images of biometrics-containing regions of the scene with 3D depth information, greatly extended depth of field (DOF), multi-spectral information, and high dynamic range (HDR). These additional capabilities provide much more information about the biometrics-containing region of the scene than a traditional camera and offer many advantages over traditional cameras for biometric enrollment or forensics applications.

Figure 4A:
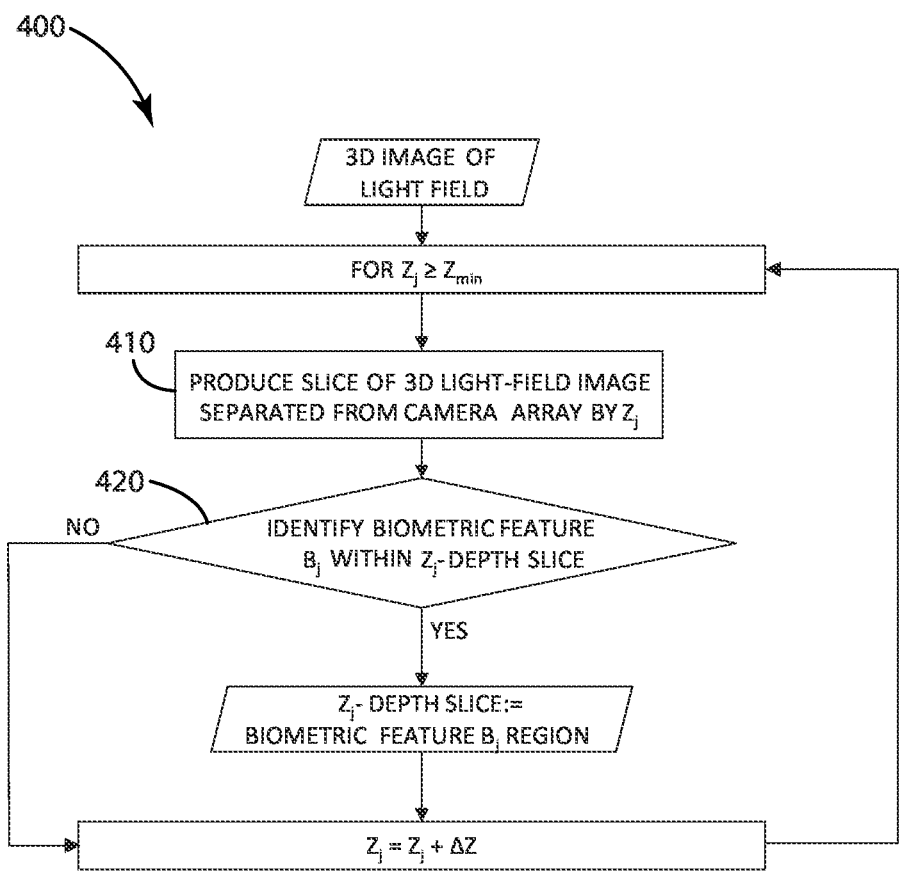
FIGS. 4A-4B show aspects of techniques for image capture, light-field reconstruction, and biometric-regions construction in one implementation of the present invention.
Figure 4B:
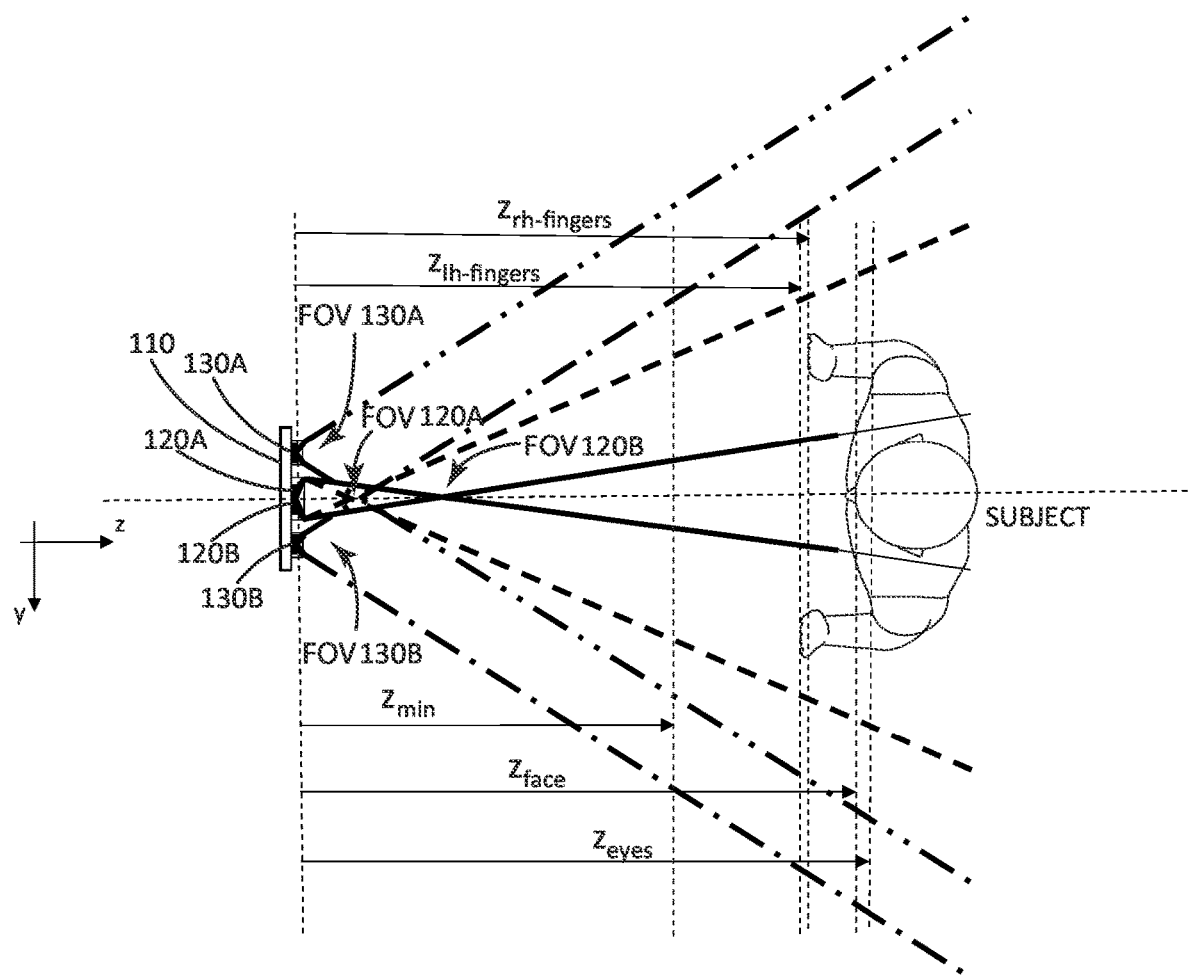

The handheld biometrics capture device 10 is designed for ease of use. The subject or subject will look at the device 10 and raise their hands (fingerprints out) to the height of their face or shoulders, as illustrated in FIG. 4B, for instance. The cameras of the array will then capture simultaneously images of a portion of the subject that includes the subject's face, irises, and fingerprints, each image being captured by a corresponding camera of the array along a different optical path. The simultaneously captured images are then processed by the image processing section 202 to reconstruct the light field associated with the subject's portion. In view of the above, the image capture section 200 together with a light-field reconstruction subsection of the image processing section 202 are herein referred to as a "light-field capture" system. Moreover, the image processing section 202 is configured to scan, e.g., back-propagate through, the reconstructed light field (or "captured light field") to locations corresponding to respective biometrics and synthesize images thereof that are adjusted for image depth, exposure, and other image properties. In this manner, the biometric processing section 204 is configured to extract all three biometrics (face, irises, fingerprints) from the reconstructed images obtained by the image processing section 202 using a single set of images captured simultaneously by the image capture section 200. This single set of images may be captured by the image capture section 200 in one to two seconds per subject, with the light-field techniques noted above reducing the likelihood of low quality images and the need for secondary image capture. Likewise, image processing performed by the biometric processing section 204 is fast, with newly enrolled biometrics checked against an onboard watchlist section 206 in a matter of three to five seconds. With this technology, large crowds could be scanned and enrolled quickly.

Because the light-field capture system eliminates the time needed for mechanical adjustments prior to capturing usable biometric imagery, the handheld biometric imaging device 10 is able to capture multiple images for each newly enrolled subject during the time otherwise spent manually adjusting camera settings. As part of the image processing pipeline, the device 10 is configured to automatically select and save the highest quality images with minimal motion blur, good illumination, and where the subject has their eyes open and is looking at the camera.

Referring again to FIG. 7, the image processing section 202 is configured to process the simultaneously captured infrared-light images and visible-light images to form a 3D image of the light field associated with the portion(s) of the subject that include(s) the subject's face, irises, and fingerprints, and reconstruct cross-sections of the 3D light-field image associated with biometric regions of those portions to provide an iris region reconstruction, a fingerprint region reconstruction, and a face region reconstruction. The image processing section 202 may be configured to implement any of a wide range of conventional image processing algorithms for obtaining a 3D image of a light field from a plurality of images taken by cameras with different perspectives and/or different focal lengths. Examples of such image processing algorithms were described in, e.g., "High Performance Imaging Using Large Camera Arrays" by Wilburn et al, published in *ACM Transactions on Graphics*, Vol 24, No 3, July 2005, pp. 765-776 (Proceedings of ACM SIGGRAPH 2005), or "Light Field Photography with a Handheld Plenoptic Camera" by Ng et al, published in *Stanford Tech Report CTSR*, 2005-02, pp. 1-11, and are reviewed in "Light Field Image Processing: An Overview" by Wu et al, published in *IEEE Journal of Selected Topics in Signal Processing*, Vol. 11, No. 7, October 2017, all of which are incorporated herein by reference in their entirety. In the illustrated embodiment, the visible-light images and the infrared-light images are combined using the noted image processing algorithms to form a single multi-spectral 3D image of the light field. For example, each set of simultaneously captured images may be used to arrive at a corresponding 3D light-field image using the noted one or more conventional algorithms. In alternative embodiments, the infrared-light images may be separately processed and combined into an infrared 3D image of the light field. This may be useful in applications in which the infrared-light images are used separate from the visible-light images to extract the biometric templates, such as in the context of some iris templates.

Following construction of the 3D light-field image, the image processing section 202 may reconstruct an iris region, a fingerprint region and a face region from the 3D light-field image. Techniques used by the image processing section 202 for these reconstructions are described below in connection with FIGS. 4A-4B. With reference to the flowchart 400 shown in FIG. 4A, back-propagation methods, which are conventional in the field of 3D light-field image processing, are used at 410 by the image processing section 202 to isolate, or "focus" on, a cross-section of the reconstructed 3D light-field image that is spaced apart from the camera array by a distance "Zj." This cross-sectional slice of the reconstructed 3D light-field image is also referred to as the synthetic aperture at depth Zj of the reconstructed 3D light-field image. The image processing section 202 is configured to calculate the amplitude and the phase of the light field within the slice at the desired distance Z. In this manner, the image processing section 202 suitably produces an image of the Zj-depth slice. Next, conventional image processing algorithms, such as those summarized in "A Review of Image Processing Methods and Biometric Trends for Personal Authentication and Identification" by Choras, published in *International Journal of Circuits, Systems and Signal Processing*, Volume 10, 2016, or those described in "Diatom autofocusing in brightfield microscopy: a comparative study" by J. L. Pech-Pacheco et al., published in *Proceedings 15th International Conference on Pattern Recognition. ICPR*-2000, pp. 314-317 (each of these articles is incorporated herein by reference in their entirety), are used at 420 by the image processing section 202 to identify one or more biometric features of interest within the Zj-depth slice through the 3D light-field image. Note that a feature identified within a Zj-depth slice is classified as a biometric feature if it meets a corresponding quality score. For example, the image processing section 202 is configured to identify, within the Zj-depth slice, one or more face features, one or more iris features, or one or more fingerprint features. Once a biometric feature "Bj" has been identified within a Zj-depth slice, at 420Y, the latter will be classified as a biometric feature-containing slice of the reconstructed 3D light-field image and will be referred to simply as the corresponding biometric-feature region, e.g., a face region, an iris region, or a fingerprint region. If at least one biometric feature cannot be identified within the Zj-depth slice, at 420N, then the image processing section 202 is configured to iterate operations 410 and 420 through other slices of the reconstructed 3D image of the light field, in the following manner. At 410, the image processing section 202 suitably produces an image of another slice spaced apart from the camera array by an incrementally larger distance "Zj+ΔZ." Note that the search for slices that contain biometric features can start with a slice having a minimum separation $Z_{min}$ from the camera array, e.g., shown in FIG. 4B, where $Z_{min}$ can have a value in the range of 0.5-1 meter. The increment ΔZ can be arbitrarily chosen within a range of values that may typically lie between 1 mm and 10 mm. Referring again to FIG. 4A, at 420, the image processing section 202 processes the produced image of the (Zj+ΔZ)-depth slice to identify therein at least one biometric feature. And then the loop of method 400 is iterated until all desired biometric features have been identified within slices of the reconstructed 3D light-field image. FIG. 4B shows a slice of the reconstructed 3D light-field image spaced apart from the camera array by a distance $Z_{eyes}$ within which the image processing section 202 has identified one or more of the subject's irises. This ($Z_{eyes}$)-depth slice is referred to as the iris region. Although FIG. 4B shows a situation in which both irises were identified within a single ($Z_{eyes}$)-depth slice, there can be situations when each iris is identified on slices that are at different depths in the 3D light-field image. FIG. 4B shows another slice of the reconstructed 3D light-field image spaced apart from the camera array by a distance $Z_{lh\text{-}fingers}$ within which the image processing section 202 has identified one or more fingerprints of the subject's left hand. This ($Z_{lh\text{-}fingers}$)-depth slice is referred to as the left-hand fingerprint region. FIG. 4B shows yet another slice of the reconstructed 3D light-field image spaced apart from the camera array by a distance $Z_{rh\text{-}fingers}$ within which the image processing section 202 has identified one or more fingerprints of the subject's right hand. This ($Z_{rh\text{-}fingers}$)-depth slice is referred to as the right-hand fingerprint region. Although FIG. 4B shows a situation in which all fingerprints of a hand were identified within a single ($Z_{lh\text{-}fingers}$ or $Z_{rh\text{-}fingers}$)-depth slice, there can be situations when the fingertips of either the left hand or the right hand or both are identified on slices that are offset in depth within the 3D image of the light-field. FIG. 4B shows yet another slice of the reconstructed 3D image of the light field spaced apart from the camera array by a distance $Z_{face}$ within which the image processing section 202 has identified face features. This ($Z_{face}$)-depth slice is referred to as the face region.

The biometrics processing section 204 is configured to process each of the previously described biometric-feature regions to extract a corresponding biometric template thereof by cropping from each biometric-feature region a portion that encompasses the identified biometric feature(s). With continued reference to FIG. 4B, the biometrics processing section 204 suitably extracts iris templates by cropping from the reconstructed iris regions a portion that encompasses the identified irises, fingerprint templates by cropping from the reconstructed left/right-hand fingerprint region a portion that encompasses the identified fingerprints of the left/right hand, and a face template by cropping from the reconstructed face region a portion that encompasses the identified face features. In the illustrated embodiment, the biometrics processing section 204 is configured to implement conventional image cropping techniques to extract the iris template, the fingerprint template, and the face template. The biometric processing section 204 is configured to extract the foregoing templates to correspond in format with the biometric-template databases against which the extracted templates are to be compared. For example, the extracted templates may correspond in format with one or more commercial biometric-template databases, or may implement proprietary biometric-template formats.

The onboard watchlist section 206 is configured to compare the extracted iris templates, the extracted fingerprint templates, and the extracted face templates with an onboard biometric-template database, which may include previously extracted iris templates, fingerprint templates, and/or face templates. For example, the onboard controller 110 may include a database of biometric information such as fingerprint templates, iris templates, and face templates corresponding to one or more subjects. Such a database might be representative of a watchlist. In the illustrated embodiment, the onboard biometric-template database may be supplemented by, or associated with, one or more offboard watchlists that may reside on another device, server, or in the cloud. In the illustrated embodiment, the device 10 is integrated with commercial off-the-shelf biometric matching algorithms and biometric-template database software. For example, the onboard watchlist section 206 may perform the comparison using conventional template formats and conventional comparison algorithms, e.g., as described at www.biometricsinstitute.org/what-is-biometrics/types-of-biometrics/, which is incorporated herein by reference in its entirety. In addition or as an alternative, the extracted biometric templates may be compared to one or more offboard biometric-template databases. For example, the extracted biometric templates may be transferred to a remote device for comparison.

The user interface 208 is configured to manage user interaction with the device 10. The user interface 208 of the illustrated embodiment is configured to control and manage user interface component(s) to receive input from the user to the device 10 and to provide output to the user from the device 10. In the illustrated embodiment, the user interface 208 includes the touchscreen 172 and the plurality of buttons 174. In operation, the touchscreen 172 can receive user input and can display output. Alternatively, in operation, the buttons 174 can receive user input. For example, the touchscreen 172 can display one or more menus that allow the user to set/select operating parameters and to initiate and control operation of the device 10. In one implementation, the user interface 208 may initiate operation of the device 10 in response to user input, display captured images on the touchscreen either by default or in response to a user request, display reconstructed regions on the touchscreen either by default or in response to a user request, display extracted templates on the touchscreen either by default or in response to a user request, and display an output indicative of the results of the comparison performed by the onboard watchlist section on the touchscreen. The touchscreen 172 and plurality of buttons 174 represent one exemplary form of user interface, and these components may be replaced or supplemented by other user interface devices.

The present invention may be used to capture, process and compare images of a wide range of biometric features. In the illustrated embodiment, the handheld biometric imaging system 10 is configured for use with fingerprint, face and iris biometrics. However, the device 10 may in alternative embodiments capture, process and compare additional and/or alternative different biometrics. For example, in some applications where it is not necessary or desirable to consider all three biometrics, the handheld biometric imaging device 10 may be directed to capturing any two of the face, iris and fingerprint biometrics. As another example, in some applications, the handheld biometric imaging device 10 may be directed to capturing only the fingerprint biometrics. In other applications, the device 10 may work with additional and/or alternative biometrics, such as images of other physical features, behavioral features, and/or vocal features.

FIG. 6 is a block diagram 600 showing a schematic representation of the general functional components of the handheld biometric imaging device 10. In this example, the system includes a camera array 300 for capturing simultaneously images of a subject along different optical paths, a plurality of visible-light illuminators 302, a plurality of infrared-light illuminators 304, an FPGA capture controller 306, an FPGA image processor 308, a CPU/GPU system on a chip 310, a user interface 312, and a network connection 314. The handheld biometric image device 10 is one exemplary embodiment of the present invention. The functional components illustrated in FIG. 6 may be implemented using a range of alternative hardware and system components capable of providing the desired functionality. For example, one or both of the FPGAs 306, 308 can be replaced by vision controller circuitry, which are essentially GPUs or CPUs configured specifically for the functions of components 306, 308.

In the illustrated embodiment, the camera array 300 is implemented by visible-light cameras 130A-C and infrared-light cameras 120A-C shown in FIG. 3. In alternative embodiments, the camera array 300 may include alternative arrangements of cameras, including a different number of cameras, cameras of different types, cameras in different physical locations on the board 105, and/or cameras of different focal lengths. In the embodiment of FIG. 3, the visible-light illuminators 302 are visible-light illumination sources 140, such as white LEDs. In alternative embodiments, the visible-light illuminators 302 may include an alternative arrangement of visible-light illumination sources, including a different number of visible-light illumination sources, visible-light illumination sources of different types and visible-light illumination sources in different physical locations on the board 105. In the illustrated embodiment, the infrared-light illuminators 304 are infrared-light illumination sources 150, such as infrared-light LEDs. In alternative embodiments, the infrared-light illuminators 304 may include an alternative arrangement of infrared-light illumination sources, including a different number of infrared-light illumination sources, infrared-light illumination sources of different types and infrared-light illumination sources in different physical locations on the board 105.

In the illustrated embodiment, the control system 160 is implemented across one or more FPGAs 306, 308 and one or more controllers 310. As shown in FIG. 6 and discussed herein, the control system 160 includes an FPGA capture controller 306 that manages the simultaneous capture of images by controlling the camera array 300, the visible illuminators 302 and the infrared illuminators 304. An FPGA image processor 308 is provided to form and enhance a 3D image of the light field and to reconstruct biometric regions from the 3D light-field image. In this implementation of the present invention, FPGAs 306 and 308 are used to provide high-speed image capture and for early image processing tasks. In this embodiment, the CPU/GPU 310 conducts more complicated image processing tasks, quality analysis and biometric processing. The CPU/GPU 310 also suitably handles basic operating system functions, user interface functions, networking/communications and potentially other functions. In the illustrated embodiment, the user interface 312 includes a touchscreen and a plurality of buttons. However, the user interface may vary from application to application. In the illustrated embodiment, the network connection 314 includes wireless communication capabilities such as WiFi and/or Bluetooth that allows the control system 160 to communicate wirelessly with external devices or networks. In alternative embodiments, the network connection 314 may additionally or alternatively include wired communication capabilities such as Ethernet or MODBUS that enable wired communications with external devices or networks. In alternative embodiments, the system may be controlled by different arrangements of controllers, such as different arrangements of FPGA, ASICs and general purpose processors.

FIG. 3 shows the control board 110 of the illustrated embodiment. Here, the control board 110 includes a board 105 configured to support multiple cameras, illumination sources, and hardware processors, and provide communication paths between the noted components. In some implementations, the board 105 includes a PCB, which in turn can include one or more PCB modules. Referring again to FIG. 3, the handheld biometric imaging device 10 of the illustrated embodiment includes an array of cameras that includes three visible-light cameras 130A, 130B and 130C and three infrared-light cameras 120A, 120B and 120C. In this embodiment, the visible-light cameras 130A-C are spaced apart from one another so that each camera 130A-C captures visible-light images of the subject from a different perspective. For example, as shown, visible-light camera 130 may be located near one edge of the board 105 and visible-light camera 130B may be located near the opposite edge of the board 105 to provide greater difference between the perspectives of the two visible-light cameras 130A and 130B. In this embodiment, the plurality of visible-light cameras includes a third visible-light camera 130C that is disposed on the control board 110 between, and lateral to, the visible-light camera 130A and visible-light camera 130B. In the illustrated embodiment, one, two, or all three, of visible-light cameras 130A, 130B, 130C may be implemented as the visible-light cameras listed in Table 1. The number, type and arrangement of visible-light cameras in the illustrated embodiment is merely exemplary. The number, type and arrangement of visible-light cameras may vary in alternative embodiments. For example, additional or alternative visible-light cameras may be incorporated into the plurality of visible-light cameras to provide enhanced light field information. Any additional or alternative visible-light cameras may be positioned in different positions of the board 105 to provide images from different perspectives and/or may have different focal lengths.

The infrared-light cameras 120A-C are disposed near the center of the control board. In this embodiment, although two of the infrared-light cameras 120A-C are relatively close in position on the board 105 along the y-axis, they have different focal depths that allow them to capture images that collectively provide depth information about the subject. For example, in this embodiment, infrared-light camera 120A has a short focal length, infrared-light camera 120B has a long focal length, and infrared-light camera 120C is a wide angle implemented as the infrared-light cameras listed in Table 1 as infrared near, infrared far, and infrared wide, respectively. As with the plurality of visible-light cameras, the number, type and arrangement of infrared-light cameras in the illustrated embodiment is merely exemplary. The number, type and arrangement of infrared-light cameras may vary in alternative embodiments. For example, additional or alternative infrared-light cameras may be incorporated into the infrared-light camera array to provide enhanced light-field information. Any additional or alternative infrared-light cameras may have different focal lengths and/or may be positioned in different positions of the board 105 to provide images from different perspectives.

As can be seen, the camera array of the illustrated embodiment includes visible-light cameras 130A-C that provide light-field information primarily through the use of physically offset cameras that provide simultaneous image capture from different perspectives and infrared-light cameras 120A-C that provide light-field information through the use of cameras with different focal lengths and that are physically offset to provide simultaneous image capture at different focal lengths and different perspectives. In this embodiment, visible-light cameras 130A and 130B are located near opposite sides of the board 105. This provides greater separation along the y-axis between the cameras 130A and 130B, which yields images with greater differences in perspective and ultimately in improved 3D depth information. Visible-light camera 130C is positioned between, and displaced laterally along the x-axis from, the visible-light cameras 130A and 130B. Further, as shown in FIG. 3, the infrared-light cameras 120A-B are offset from one another along the x-axis along a centerline of the board 105. In this embodiment, infrared-light camera 120C is laterally offset along the y-axis from a line between the infrared-light cameras 120A and 120B. In this embodiment, infrared-light camera 120C is a wide-angle infrared camera. Although all of the cameras 120A-C and 130A-C mounted to a single control board 105, it should be understood that the cameras 120A-C and 130A-C may be distributed over two or more boards. In some implementations, cameras 120A-C and 130A-C can be freely mounted by themselves within the handheld device 10, independent of any physical board, but still fixed spatially in relation to the other cameras and illuminators 140, 150, and with appropriate communication back to the controller 160. In the latter implementations, the cameras can be disposed within a plane orthogonal to a line of sight to the subject, or they can be disposed within corresponding planes orthogonal to a line of sight to the subject. Also note that in some implementations, all illuminators 140, 150 can emit visible light, and all cameras 120, 130 are sensitive to visible light. In some implementations, all illuminators 140, 150 can emit IR light, and all cameras 120, 130 are sensitive to IR light. In some implementations, all illuminators 140, 150 can emit both visible light and IR light, and all cameras 120, 130 are sensitive to visible light and IR light.

In one exemplary embodiment, the handheld biometric imaging device 10 includes an array of six cameras capable of capturing fingerprints, face and irises simultaneously using common optics and sensors. Table 1 provides the specifications for the six cameras incorporated into this exemplary embodiment.

TABLE 1

| Camera | Mode | COC | Resolution | Focal Length | Aperture | f/# | Focus Dist. | DOF Near | DOF Far |
|---|---|---|---|---|---|---|---|---|---|
| Visible Right 130A | Color | 0.090 mm | 5 MP 2688 × 1944 | 7.3 mm | 3.6 mm | 5.7 | 500 mm | 185 mm | inf |
| Visible Left 130B | Color | 0.090 mm | 5 MP 2688 × 1944 | 7.3 mm | 3.6 mm | 5.7 | 500 mm | 185 mm | inf |
| Infrared Near 120B | 840 nm | 0.051 mm | 5 MP 2688 × 1944 | 18 mm | 9.2 mm | 1.9 | 458 mm | 400 mm | 535 mm |
| Infrared Far 120A | 840 nm | 0.051 mm | 5 MP 2688 × 1944 | 23 mm | 12.0 mm | 1.9 | 595 mm | 535 mm | 669 mm |
| Color 130C | Color | 0.090 mm | 5 MP 2688 × 1944 | 7.3 mm | 3.6 mm | 5.7 | 500 mm | 185 mm | inf |
| Infrared Wide 120C | 780 nm | 0.090 mm | 5 MP 2688 × 1944 | 7.3 mm | 5.29 mm | 1.4 | 500 mm | 231 mm | inf |

This exemplary array of cameras provides an extended DOF for iris and fingerprint capture from 400 mm (16 inches) to 669 mm (26 inches) while maintaining a circle of confusion (COC) of 0.051 mm or 500 dpi. It should be understood that this array of cameras is merely exemplary and that in alternative embodiments the cameras may vary. For example, the number and type of cameras may vary from application to application and, for each camera, the mode, COC, resolution, focal length, aperture, f-number (#), Focus Distance, DOF near and/or DOF far may vary.

The board 105 of the illustrated embodiment also supports the array of illumination sources including a plurality of visible-light illumination sources 150 and a plurality of infrared illumination sources 140. In the embodiment of FIG. 3, the visible-light illumination sources 150 are visible-light LEDs (e.g. white LEDs) and the infrared illumination sources 140 are infrared-light LEDs. The illumination sources 140 and 150 are spaced apart over the face of the control board 110 so that they are able to provide illumination of the subject from different angles. The number, type and arrangement of visible-light illumination sources 150 and infrared-light illumination sources 140 may vary from application to application to provide the desired visible-light and infrared-light lighting profiles. Although all of the illumination sources 140 and 150 are, in the illustrated embodiment, a plurality of LEDs mounted to a single board 105, it should be understood that the illumination sources 140 and 150 may be different types of illumination sources and may be distributed over two or more boards 105.

FIG. 4B is a schematic representation of a biometric image capture environment showing a control board 110 containing a representative set of visible-light cameras 130A-B and a representative set of infrared-light cameras 120A-B. Visible-light camera 130C and infrared-light camera 120C are not shown in FIG. 4B for purposes of simplicity. It should be understood that these additional cameras 120C and 130C could be added to the schematic representation with their corresponding fields of view. In this embodiment, the visible-light cameras 130A-B are selected with fields of view $FOV_{130A}$ and $FOV_{130B}$ and focal lengths that are tuned to capture images of a subject in the planned distance range, such as a range of approximately 1-3 meters along the z-axis from the control board 110. As shown, visible-light cameras 130A and 130B both have a field of view $FOV_{130A}$ and $FOV_{130B}$, respectively, that encompasses the subject, including the left hand, the right hand, and the face with the irises. Similarly, the infrared-light cameras 120A-B are selected to provide fields of view $FOV_{120A}$ and $FOV_{120B}$ and focal lengths tuned to capture images of the subject at the noted planned distance. As noted above, in the embodiment illustrated in FIGS. 3-4, infrared-light camera 120A and infrared-light camera 120B have materially different focal lengths, and thus different field of view (FOV) angles. In the example illustrated in FIG. 4B, infrared-light camera 120A has an angle of its field of view $FOV_{120A}$ that encompasses the entire subject, while infrared-light camera 120B has a narrower angle of its field of view $FOV_{120B}$ that captures the face with the irises of the subject, but not the fingerprints. In alternative embodiments, each of the infrared-light cameras 120A-B could have a FOV that captures the entire subject or they could each have a FOV that only captures the subject's irises. As described herein, the control system 160 is configured to produce a 3D image of the light field, which corresponds to images captured by corresponding cameras of the array, using conventional algorithms that allow depth information to be derived from differences in perspective and differences in focal length. Once the 3D light-field image has been produced, the control system 160 is able to process the 3D light-field image to determine slices thereof that contain biometric features using the conventional light field processing techniques noted above. For example, the control system 160 may identify features corresponding to the fingers of the right hand within a slice of the 3D image spaced apart from the camera array by a depth $Z_{rh\text{-}fingers}$, features corresponding to the fingers of the left hand within another slice of the 3D image spaced apart from the camera array by a depth $Z_{lh\text{-}fingers}$, features corresponding to the face within yet another slice of the 3D image spaced apart from the camera array by a depth $Z_{face}$, and, in some implementations, features corresponding to the eyes within yet another slice of the 3D image spaced apart from the camera array by a depth $Z_{eyes}$. As explained herein, the control system 160 of the illustrated embodiment classifies the appropriate ones of the foregoing slices as the corresponding reconstructed fingerprint region, face region, and iris region.

Figure 5:
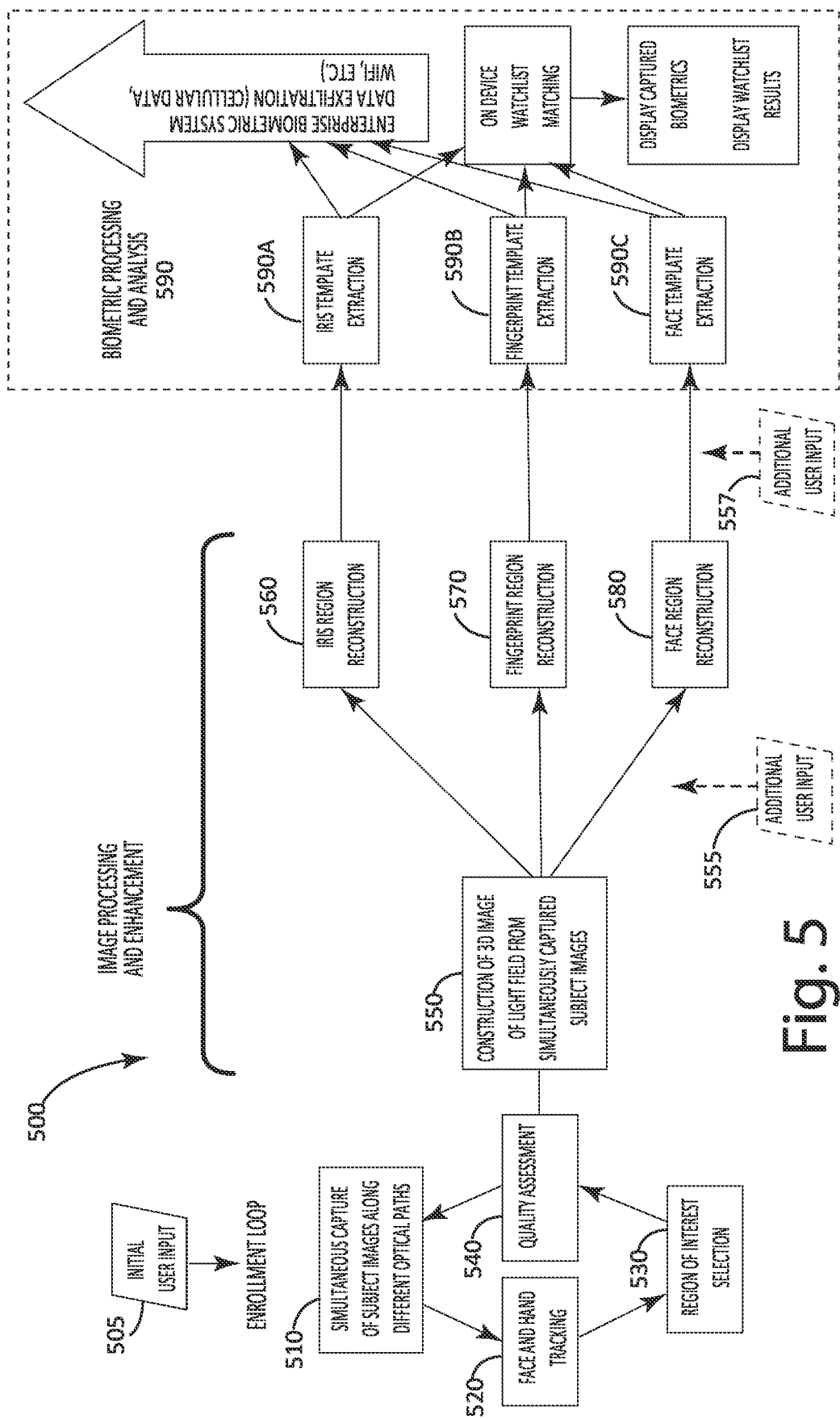
FIG. 5 is a schematic representation of the image processing dataflow.

The handheld biometric imaging device 10 may implement a range of image processing dataflows. FIG. 5 shows one exemplary image processing dataflow 500 that may be implemented by the device 10. In this implementation, high quality images are provided through tight coupling between the camera array and the computational imaging pipeline. In the example illustrated in FIG. 5, the device 10 is configured to initiate the dataflow 500 in response to user input 505 received in the user interface 312.

At 510, high-resolution images of a subject are simultaneously captured along different optical paths using the array of cameras 300, which in this embodiment includes six cameras, but in other embodiments can include a different number of cameras. This capture may benefit from precise timing between the cameras 120A-C and 130A-C and the illumination sources 140 and 150 to capture a short burst of images. Customized electronic components such as FPGA or ASIC chips are used in this embodiment to control triggering the cameras 120A-C, 130A-C and illumination of the illumination sources 140, 150. High speed interfaces on these chips help to ingest and process the high-resolution images from the multi-camera array 120A-C, 130A-C. During the burst of image collection the illumination sources 140, 150 are strobed independently to create a variety of illumination profiles to help distinguish facial features, fingerprint ridges, and iris musculature that are helpful in producing high-quality images. For example, the device 10 may capture a first set of simultaneous images from all cameras 120A-C, 130A-C while the subject is under a first illumination profile, and then device 10 may capture additional sets of simultaneous images from all cameras 120A-C, 130A-C, with each set of simultaneous images being taken under different illumination profiles.

At 520, as the images are captured, object detection algorithms and visual tracking algorithms are used to track the motion of the face and hands and determine regions of the images containing face, iris, and fingerprint data. This tracking allows the device to focus computational resources on the relevant image regions which saves computational effort to help maintain a responsive system. The object detection and visual tracking algorithms may be conventional object detection and visual tracking algorithms. In some implementations, the handheld biometric imaging device 10 may be specially configured to reduce motion blur in the images captured at 510. Here, to mitigate motion blur the control system 160 may integrate a 6-axis inertial measurement unit (gyroscope+accelerometer) and a generally conventional visual tracking system into the camera triggering controller (e.g. FPGA capture controller 306). Conventional visual tracking systems are fast and can be used to determine when the cameras motion matches that of the subject and will then take a picture with minimal motion blur. The system may also strobe the illumination LEDs in combination with reducing the integration time to help reduce any effects of motion.

At 530, the regions of interest are selected and cropped while the image data is still within the image capture subsystem 200, e.g., on the FPGA or ASIC chips. In this embodiment, the selection and cropping functions are implemented using conventional selection and cropping algorithms.

At 540, an image quality assessment is conducted on face, iris, and fingerprint regions. Simple analyses are conducted initially within the image capture subsystem 200, e.g., on the FPGA or ASIC devices, to determine if the images meet basic brightness, contrast, and resolution thresholds using conventional algorithms. If the images do not meet basic requirements, additional images can be captured and evaluated for quality. The process may repeat until images of sufficient quality have been obtained. In some applications, the device 10 may be configured to obtain a series of simultaneous sets of images with each set of images being taken under different illumination profiles. In such applications, the device may cycle through the different sets of images to determine if any are acceptable before initiating a supplemental image capture. In some applications, different image sets may be used for different biometrics. For example, if the best fingerprints images are contained in a first set of images and the best iris images are contained in a second set of images, the fingerprint reconstructions can be derived from the first set of images and the iris reconstructions can be derived from the second set.

At 550, a 3D image of the light field associated with the subject is reconstructed using at least portions of the simultaneously captured subject images. In this embodiment, the light-field reconstruction requires all N images to be aligned and then fused into a detailed image. Also, in this embodiment, image illuminance is integrated across all simultaneously captured subject images to improve contrast and reduce noise. In the illustrated embodiment, these steps are implemented using the above-noted conventional image and light field processing algorithms.

In this embodiment, the camera array will be calibrated using conventional calibration techniques. The calibration process includes estimation of the intrinsic and extrinsic imaging parameters of each camera. These parameters will determine the correspondence between pixel coordinates and world coordinates for all cameras. Consequently, this calibration information can be used to formulate a function for light-field reconstruction using conventional techniques. At 560, 570, and 580, after the function for light-field reconstruction is approximated as noted above, its manipulation will result in object reconstruction for different depths and synthetic apertures as described above in connection with FIGS. 4A-4B. These will define the DOF and resolution of the biometric reconstructions, the latter being "in-focus images" of corresponding biometrics. In some implementations, the desired reconstruction depth for iris, face, and fingerprints can be determined by a coarse depth estimate from a camera pair with the largest baseline and that still contain the tracked biometric. For face, iris, and fingerprints, the function for light-field reconstruction will offer depth and surface information that can be used to enhance the biometrics signature. In particular for the fingertips, the device 10 may map the non-contact fingertip image, e.g., the reconstructed ($Z_{ln\text{-}fingers}$)-depth slice or reconstructed ($Z_{rh\text{-}fingers}$)-depth slice, to its contact version (i.e., stretched flat version) that it is typically expected on commercial fingerprint matchers. While each biometric image is reconstructed separately, in this embodiment of dataflow 500, the algorithms used at 560, 570, and 580 may be generally similar across all biometrics.

At 560, the image collection is combined to construct an approximately 400 dpi NIR reconstruction of the eye regions around the iris to maintain compatibility with iris collection standards guidelines and images collected from other iris sensors. Because traditional iris collection devices operate in NIR, this reconstruction will also emphasize the Red and NIR channels.

At 570, fingerprint images are reconstructed from all images where computations are selected to provide maximum resolution and maximum contrast for fingerprint ridges. Reconstructions may be done at 500 dpi to be compatible with other fingerprint sensors, and all captured images may be used to distinguish the ridge to valley differences which can be challenging when using touchless sensors. The multiple views of the fingers are also beneficial in obtaining additional fingerprint texture wrapping around the curved surfaces of the fingers.

At 580, face recognition images from any of the color or NIR cameras can be used unmodified with traditional face recognition algorithms without reconstruction and have sufficient resolution and contrast for accurate matching. Matching is enhanced for some commercial algorithms by reconstructing a 3D depth map of the face allowing the face to be digitally rotated to obtain a more frontal image of the face or to enhance the face biometric with three-dimensional detail.

At 590, starting at respective template extractions 590A, 590B, 590C, the reconstructed images are passed to conventional algorithms which complete the biometric matching process and watchlist searches.

In some implementations, the iris-finding pipeline performed in accordance with 560 & 590A, the fingerprint-finding pipeline performed in accordance with 570 & 590B, and the face-finding pipeline performed in accordance with 580 & 590C are carried out by device 10 without any additional user input 555 or 557.

In other implementations, the user interface 312 prompts a user of the device 10, e.g., on a touchscreen 176, to initiate one or more biometric analyses from among an iris analysis, a fingerprint analysis, or a face analysis after completion of the iris region reconstruction at 560, of the fingerprint region reconstruction at 570, and of the face region reconstruction at 580. Here, the device 10 carries out one, two, or three of the iris template extraction at 590A, the fingerprint template extraction at 590B, or the face template extraction at 590C only in response to receipt, in the user interface, of user instructions 557 to initiate the corresponding one, two or three of the iris, fingerprint, or face analyses.

In yet other implementations, the user interface 312 prompts the user of the device 10, e.g., on the touchscreen 176, to initiate one or more biometric analyses from among an iris analysis, a fingerprint analysis, or a face analysis after reconstruction of the light field at 550. Here, the device 10 carries out one, two, or three of the iris region reconstruction at 560 followed by the iris template extraction at 590A, of the fingerprint region reconstruction at 570 followed by the fingerprint template extraction at 590B, or of the face region reconstruction at 580 followed by the face template extraction at 590C in response to receipt, in the user interface, of the user instructions 555 to initiate the corresponding one, two or three of the iris, fingerprint, or face analyses.

The handheld biometric imaging device 10 has the potential to provide a range of benefits. For example, in different embodiments, the present invention may provide one or more of the following benefits:

A multi-spectral camera array that can quickly capture high resolution image data for more efficient and more reliable biometrics enrollment. Using light-field imaging technology, the full frame of each reconstructed light-filed 3D image is tunable, allowing for post-image depth adjustment, and thereby faster, more user-friendly biometrics enrollment. This type of imagery also includes additional information not typically captured by traditional cameras including 3D depth information.

Capture and enrollment of face, iris, and fingerprint biometrics in a single shot.

3D face capture with HDR processing. This allows for 3D face recognition algorithms to be applied to the data and can also be used to render better image for 2D matching. The device may implement image processing algorithms to correct for poor illumination and the face can also be rendered from other perspectives to better match frontal images.

On-device biometric-template database functionality, e.g., for Face, Iris, and Fingerprints.

Upgradability via software plugins, software updates, and hardware modules.

The multi-spectral, 3D, and computation capabilities of the device can bring new analysis capabilities to the field of multi-camera imaging. In one example, the device 10 may be configured for light field imagery of a document. For instance, the 3D image of a light field associated with a document could be used to scale and rotate the document to a frontal view. The computation capabilities of the device could provide fast Optical Character Recognition (OCR), semantic analysis, and translation on board the device.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A handheld biometric imaging device comprising:
   at least one board;
   an array of illumination sources disposed on the board, the array of illumination sources including a plurality of visible-light illumination sources and a plurality of infrared-light illumination sources;
   an array of cameras disposed on the board, the array of cameras including a plurality of visible-light cameras and a plurality of infrared-light cameras, the plurality of visible-light cameras including a first visible-light camera and a second visible-light camera arranged and configured to capture visible-light images of a subject when the subject is illuminated by at least some of the visible-light illumination sources, the plurality of infrared-light cameras including a first infrared-light camera and a second infrared-light camera arranged and configured to capture infrared-light images of the subject when the subject is illuminated by at least some of the infrared-light illumination sources; and
   an onboard control system including:
      an image capture subsystem configured to control the visible-light illumination sources the infrared-light illumination sources, the visible-light cameras, and the infrared-light cameras to capture simultaneously the infrared-light images and the visible-light images under a predetermined illumination profile, an image processing subsystem configured to
process the simultaneously captured infrared-light images and visible-light images to form a 3D image of light field associated with the subject, and
reconstruct cross-sections of the 3D light-field image associated with biometric features of the subject to provide a reconstructed iris region, a reconstructed fingerprint region, and a reconstructed face region,
a biometrics processing subsystem configured to extract an iris template from the reconstructed iris region, a fingerprint template from the reconstructed fingerprint region and a face template from the reconstructed face region,
an onboard watchlist subsystem that compares the extracted iris template, the extracted fingerprint template and the extracted face template with biometric templates from an onboard biometric-template database associated with one or more watchlists, and
a user interface subsystem configured to selectively initiate reconstruction of at least one of the iris region, fingerprint region or face region in response to corresponding user input and to display an output indicative of the results of the comparison performed by the onboard watchlist subsystem,
wherein at least some of the subsystems of the control system are disposed on the board.

2. The device of claim 1 wherein:
the image capture subsystem is configured to control the plurality of illumination sources, the visible-light cameras, and the infrared-light cameras to capture additional infrared-light images and visible-light images under a plurality of different illumination profiles, and
the image processing subsystem configured to form, from the infrared-light images and visible-light images simultaneously acquired under a respective illumination profile, a corresponding additional instance of the 3D light-field image associated with the subject.

3. The device of claim 1 wherein:
the first visible-light camera and the second visible-light camera are spaced apart from each other along a first direction in a plane of the board to allow simultaneous capture of first and second visible-light images of the subject from different perspectives, and
the first infrared-light camera and the second infrared-light camera are spaced apart from each other along a second direction in the plane of the board different from the first direction to allow simultaneous capture of first and second infrared-light images of the subject from other perspectives that are different from each other and from the perspectives of the first and second visible-light images.

4. The device of claim 3 wherein the first and second visible-light cameras have substantially equal-value focal lengths.

5. The device of claim 3 wherein the plurality of visible-light cameras includes a color HDR camera laterally spaced from the first direction in the plane of the board, the color HDR camera configured to capture a third visible-light image of the subject simultaneously with the first and second visible-light images, whereby the first, second, and third visible-light images together with the infrared-light images are to be processed in combination to form an instance of the 3D light-field image that is richer in information.

6. The device of claim 3 wherein the first infrared-light camera and the second infrared-light camera have different focal lengths to allow simultaneous capture of respective first and second infrared-light images focused on corresponding first and second cross-sections of a volume associated with the subject, the first and second planes spaced apart from each other along a direction orthogonal to a plane of the board.

7. The device of claim 6 wherein the plurality of infrared-light cameras includes a wide-angle infrared-light camera laterally spaced from both the first and second directions in the plane of the board, the wide-angle infrared-light camera configured to capture a third infrared-light image simultaneously with the first and second infrared-light images, whereby the first, second, and third infrared-light images together with the visible-light images are to be processed in combination to form an instance of the 3D light-field image that has a wider FOV.

8. The device of claim 1 wherein the infrared-light illumination sources includes a plurality of infrared LEDs, and the visible-light illumination sources include visible-light LEDs.

9. The device of claim 1 wherein the image processing system includes an initial stage implemented in an FPGA or ASIC and a secondary stage implemented in a general purpose controller;
wherein the initial stage controls operation of the array of illumination sources, capture of images from the array of cameras and initial processing of the captured images; and
wherein the secondary stage implements supplemental image processing, biometric processing and communications with external systems.

10. The device of claim 9 wherein the onboard control system is configured to transfer the extracted iris templates, fingerprint templates, and face template to an external storage or computational resource.

11. The device of claim 1 wherein the image processing subsystem is configured to
use the reconstructed fingerprint region to produce fingerprint images, and
convert the fingerprint images into an image simulating contact with a conventional fingerprint reader, whereby the extracted fingerprint template can be directly compared with conventional fingerprint templates obtained using conventional fingerprint readers.

12. A handheld biometric imaging device comprising:
a plurality of visible-light illuminators;
a plurality of infrared-light illuminators;
a camera array including a plurality of visible-light cameras and a plurality of infrared-light cameras, the plurality of visible-light cameras including a first visible-light camera and a second visible-light camera arranged and configured to capture visible-light images of a subject when the subject is illuminated by at least one of the visible-light illuminators, the plurality of infrared-light cameras including a first infrared-light camera and a second infrared-light camera arranged and configured to capture infrared-light images of the subject when the subject is illuminated by at least one of the infrared-light illuminators;
an onboard capture controller configured to simultaneously capture a plurality of images via the visible-light cameras and the infrared-light cameras;
an onboard image processor configured to produce a 3D image of a light field from the captured images and to reconstruct biometric regions associated with the subject from the 3D light-field, the biometric regions including a face region, an iris region and a fingerprint region;

a controller configured to conduct image processing of the reconstructed biometric regions to extract a plurality of biometric templates and perform biometric processing of the extracted biometric templates, the biometric processing including comparing the extracted biometric templates against previously obtained biometrics; and a user interface configured to selectively initiate reconstruction of at least two of the iris region, fingerprint region, or face region in response to user input and to display an output indicative of the results of the biometric-template comparison performed by the controller.

13. The device of claim 12 wherein the first infrared-light camera and the second infrared-light camera have different focal lengths to allow simultaneous capture of respective first and second infrared-light images focused on corresponding first and second cross-sections of a volume associated with the subject.

14. The device of claim 13 wherein the first visible-light camera and the second visible-light camera are spaced apart from each other along a first direction in a plane of the board to allow simultaneous capture of first and second visible-light images of the subject from different perspectives.

15. The device of claim 14 wherein the first infrared-light camera and the second infrared-light camera are spaced apart from each other along a second direction in the plane of the board different from the first direction to allow simultaneous capture of first and second infrared-light images of the subject from other perspectives that are different from each other and from the perspectives of the first and second visible-light images.

16. The device of claim 15 wherein the first and second visible-light cameras have substantially equal-value focal lengths.

17. The device of claim 12 wherein at least a portion of the controller is located remote from the device; and
wherein the device includes a wireless communication system, the wireless communication system configured to transmit at least one of the extracted biometric templates to the remote portion of the controller, whereby the controller remotely compares the transmitted biometric templates against a remote biometric-template database associated with at least one watchlist.

18. The device of claim 12 wherein the user interface includes a touchscreen, buttons, or both.

19. A method for obtaining biometrics from a subject, comprising the steps of:
capturing a plurality of images of a subject simultaneously by a handheld biometric imaging device that comprises a camera array, the subject positioned with the subject's hands raised and open with the palms facing the device, whereby the subject's face, irises and fingerprints are captured in the plurality of images;
processing the plurality of images, by one or more hardware processors of the device, to produce a 3D image of a light field, the 3D light-field image including biometric information associated with the subject's face, irises and fingerprints;
processing the 3D light-field image, by the one or more hardware processors of the device, to reconstruct a face region, an iris region, and a fingerprint region;
performing, by the one or more hardware processors of the device in response to user selection received through a user interface of the device, two or more of a), b), or c), wherein a) comprises processing the face region to extract a face template,
b) comprises processing the iris region to extract an iris template, or
c) comprises processing the fingerprint biometric region to generate a fingerprint template; and
comparing, by the one or more hardware processors of the device, the corresponding two or more of the face template, the iris template, or the fingerprint template against a biometric-template database associated with one or more watchlists to determine if the subject is on at least one of the watchlists.

20. The method of claim 19 wherein the step of capturing images is performed by vision controller circuitry configured as at least one of a CPU, a GPU, a field programmable gate array, or an application specific integrated circuit.

21. A memory encoding instructions that, when executed by one or more hardware processors of a handheld biometric imaging device that comprises a camera array and a user interface, cause the device to perform operations comprising:
simultaneously capturing, by the cameras of the array, a plurality of images of a subject, the subject positioned with the subject's hands raised and open with the palms facing the device, whereby the subject's face, irises and fingerprints are captured in the plurality of images;
producing a 3D image of a light field from the plurality of images, the 3D light-field image including biometric information associated with the subject's face, irises and fingerprints;
prompting, in the user interface, a user of the device to initiate one or more biometric analyses from among a face analysis, an irises analysis, or a fingerprint analysis, and
receiving, in the user interface, user selection of two or more of the biometric analyses;
selectively performing, based on the selection, operations comprising corresponding two of a), b), or c), wherein
a) comprises reconstructing a face region of the 3D light-field image, and extracting a face template from the reconstructed face region,
b) comprises reconstructing an iris region of the 3D light-field image, and extracting an iris template from the reconstructed iris region, or
c) comprises reconstructing a fingerprint region of the 3D light-field image, and extracting a fingerprint template from the reconstructed fingerprint region; and
comparing the corresponding two or more of the face template, the iris template, or the fingerprint template against a biometric-template database associated with one or more watchlists to determine if the subject is on at least one of the watchlists.

22. A handheld biometric imaging device comprising:
a plurality of illuminators configured to emit visible light, infrared light or both;
three or more cameras that are sensitive to visible light, infrared light or both, the cameras
fixed spatially in relation to one another and to the illuminators, and
configured to capture images of a subject when the subject is illuminated by at least one of the illuminators;
an onboard capture controller configured to simultaneously capture a plurality of images using the cameras;
an onboard image processor configured to produce a 3D image of a light field from the captured images and to reconstruct biometric regions associated with the subject from the 3D light-field, the biometric regions including one or more of a face region, an iris region and a fingerprint region;

a controller configured to conduct image processing of the reconstructed biometric regions to extract corresponding biometric templates and perform biometric processing of the extracted biometric templates, the biometric processing including comparing the extracted biometric templates against previously obtained biometrics; and a user interface configured to selectively initiate reconstruction of at least one of the iris region, fingerprint region, or face region in response to user input and to display an output indicative of the results of the biometric-template comparison performed by the controller.

23. The handheld biometric imaging device of claim 22, wherein the cameras are disposed within a plane orthogonal to a line of sight to the subject.

24. The handheld biometric imaging device of claim 22, wherein the cameras are disposed within corresponding planes orthogonal to a line of sight to the subject.

* * * * *

UNITED STATES PATENT AND TRADEMARK OFFICE
CERTIFICATE OF CORRECTION

PATENT NO. : 11,341,224 B2
APPLICATION NO. : 17/162319
DATED : May 24, 2022
INVENTOR(S) : Bolme et al.

It is certified that error appears in the above-identified patent and that said Letters Patent is hereby corrected as shown below:

In the Claims

Column 20, Claim 1, Line 63:
After "sources" insert -- , --

Signed and Sealed this
Twenty-eighth Day of June, 2022

Katherine Kelly Vidal
*Director of the United States Patent and Trademark Office*